May 9, 1944.  G. P. CHRISTOPHER  2,348,452
UTENSIL LID
Filed March 31, 1942
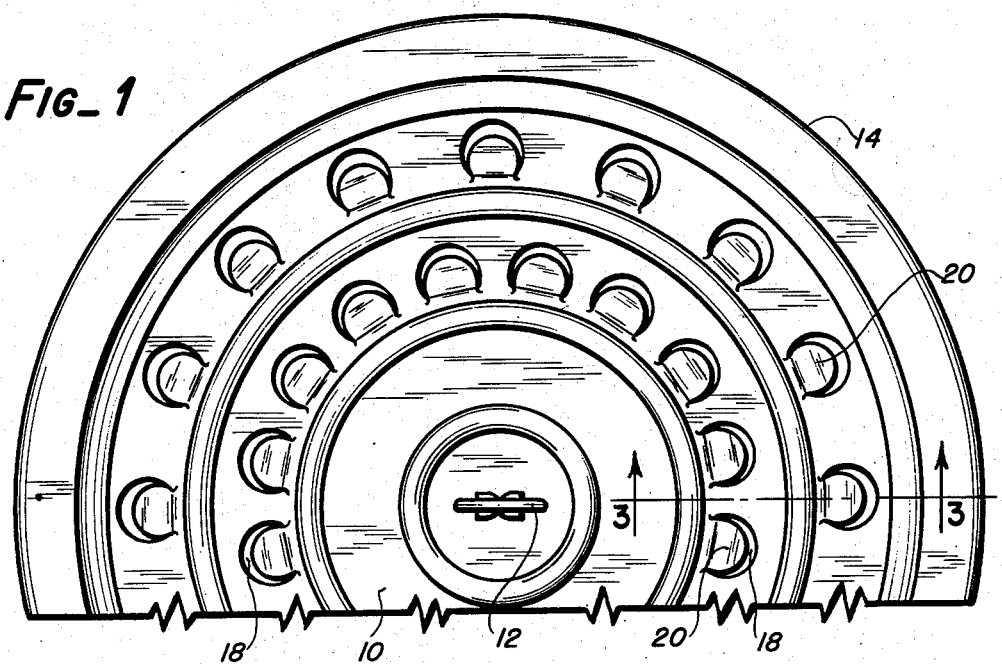
FIG_1
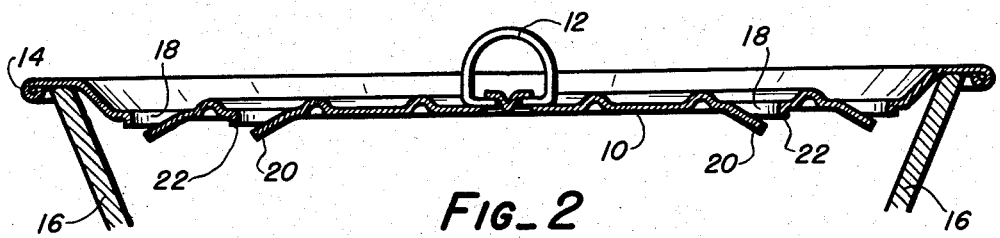
FIG_2
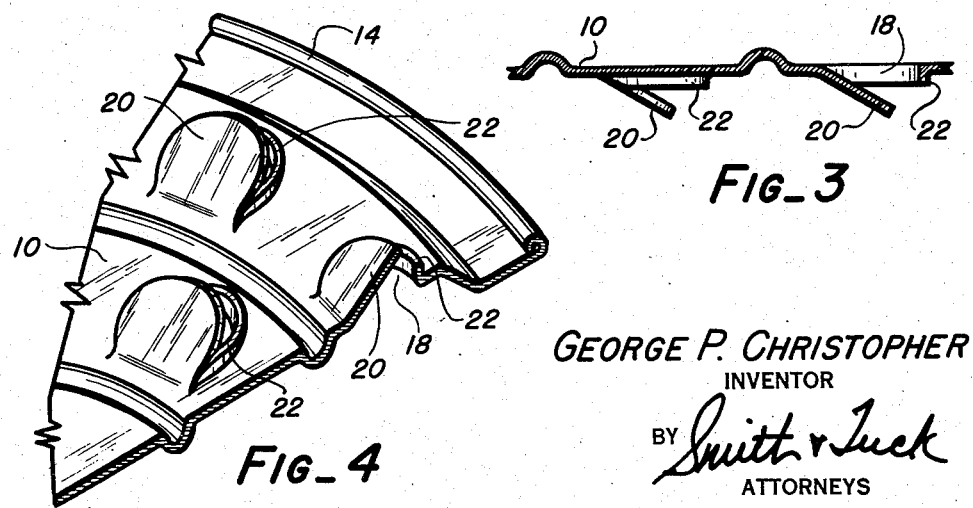
FIG_3
FIG_4
GEORGE P. CHRISTOPHER
INVENTOR
BY *Smith & Tuck*
ATTORNEYS Patented May 9, 1944

2,348,452

UNITED STATES PATENT OFFICE 2,348,452

UTENSIL LID

George P. Christopher, Seattle, Wash., assignor to Lillian S. Christopher, Seattle, Wash.

Application March 31, 1942, Serial No. 436,927

5 Claims. (Cl. 99—347)

My invention relates to utensil lids and, more particularly to lids of the type employed during cooking operations to close frying pans, skillets, pots, kettles and the like.

The problems solved by my invention are ones that have existed for a long time and which have previously not been satisfactorily met and overcome. For example, in cooking or frying meat in a skillet or roaster, steam and water vapors produced during the cooking action have not been permitted to freely escape from the enclosed area and without condensing upon the under side of the lid. The result is that a substantial portion of the moisture that has been condensed is returned to the food being cooked and to the hot surface of the cooking unit, where it is revaporized. The result is that the food is cooked in an atmosphere having a relatively high humidity. In short, it is steamed or boiled rather than being roasted or fried as is desirable. In such cooking, an attendant circumstance is the spatter of the grease particles in the pan due to the presence of moisture forming pockets of steam which, upon bursting, cause the grease to fly about. Where vents for the steam have been provided previously, there has been no suitable segregation of the seam from the flying grease particles, and such devices as applicant has been able to discover are complicated and difficult to manufacture, as well as difficult to maintain in a clean and sanitary state. Heretofore there has existed no lid having a plurality of vent apertures which are suitably baffled to permit the dispersal of steam and, at the same time, prevent the departure of grease particles outside the pan or pot.

Having in mind the defects of the prior art, it is an object of my invention to provide a lid that is easy to manufacture because of its simple mode of construction and form, and in which the exhaust of steam is permitted while the retention of heavier flying particles is maintained.

Another object of my invention is to provide, in a vented lid, baffling means for the vent apertures which lowers or precludes the possibility of grease particles flying through the apertures and which apertures are shielded around the edge in a manner to effect a return of such grease as may accumulate on the under surface of the lid to the cooking surface.

A still further and more specific object of my invention is to provide in a lid of the type described a flanged opening also having a baffle in line and that can be easily maintained in a clean and sanitary state.

Other objects and advantages of the invention will be more apparent from the following specification.

The foregoing objects and others ancillary thereto I prefer to accomplish as follows:

According to the preferred embodiment of my invention, I arrange in a lid a plurality of apertures in any predetermined pattern. In the accompanying drawing the pattern adopted for the disposal of the apertures in the lid arranges them in concentric relation to the axis of the lid. This pattern provides a uniform arrangement of the apertures. It will be obvious that other patterns equally efficacious could be adopted without departing from the principles of the invention. Specifically, each aperture is shown to be somewhat greater than semi-circular and around the rim is provided a downturned flange, useful in a manner later to be described. Depending from the under surface of the lid in which the apertures are formed are baffle members so disposed and arranged that one lies in spaced relation in the mouth of each aperture. Preferably this baffle is integral with the body of the lid and in practice I employ the material of the lid which is removed to form the aperture to also form the baffle. In this way joints are avoided and cracks and crevices liable to accumulate grease and filth are precluded.

The novel features that I consider characteristic of my invention are set forth with particularity in the appended claims. The invention itself, however, both as to its organization and its method of use, together with additional objects and advantages thereof, will be best understood from the following description of a specific embodiment, when read in connection with the accompanying drawing, in which:

Figure 1 is a plan view of the top of a lid according to my invention, with a portion omitted for convenience of illustration, Figure 2 is a diametrical cross-sectional view of the lid of Figure 1 with its mode of association with a cooking utensil suggested, Figure 3 is an enlarged fragmentary cross-section of the lid taken on line 3—3 of Figure 1, and Figure 4 is an enlarged fragmentary perspective view of the under side of my lid.

A utensil lid, to overcome the defects hereinbefore enumerated, must have at least three totally distinct characteristics. It must be capable of functioning properly during the cooking operation to permit the escape of the maximum amount of steam and at the same time to entrap spattering grease particles, and it also must be a device that operates without attention, lie automatically to permit steam and grease segregation, and in addition, such a lid must be one that is easily cleansed once it has become soiled during use.

Accordingly, a preferred embodiment of my invention, referring to Figures 1 and 2, is constituted by the lid 10, which is usually circular in shape, and in which or through which is formed the desired venting apertures and baffles. It is customary to provide such lids with a handle or ring 12 suitable for placing it in position and removing it therefrom. Around the rim 14 is customarily a channel for engagement over the cooking utensil. The walls of such a utensil are suggested by the numbers 16, 16.

According to the pattern adopted in this disclosure, a plurality of apertures in two separate rings is arranged around the axis of the lid. Each aperture 18 is formed by cutting a segment 20 from the material of the lid and depressing it downwardly at an angle to the general plane of the lid. The resultant aperture is curved similarly to the edge of the member 20 and it is provided with a downturned flange 22.

Ordinarily such lids are formed of relatively thin metal stock, and in such cases the apertures and the baffles 20 are formed simultaneously by cutting and depressing the segment 20 and the flange 22. It will be noted that in this preferred showing of my invention the segments 20 are all depressed in a manner so that they are directed downwardly and outwardly from the axis of the lid. With this arrangement it can be seen that we have a plurality of apertures each of which is partially baffled by the member 20 and as well by the flange 22. Since it has been observed that the greatest proportion of the flying particles of spattering grease and the like tend to be directed at the lid at an angle, somewhat radiant outwardly from the axis of the lid and pan, the tongues or baffles 20 are thus ideally placed in the mouth of the aperture. Should the direction be at an angle radially inward or otherwise, the rim or flange 22 serves to entrap the particles and to prevent them from passing through the apertures.

It is to be understood that the showing in the drawings is exemplary and that while, for the convenience of illustration, a relatively large space is shown between the edge of the baffle tongue 20 and the other edge of the aperture, it is only necessary in actual practice to dispose the baffles below the upper surface sufficiently to leave a relatively small slit aperture. Through this aperture steam will readily pass, but at the same time grease particles do not easily pass.

The tongues 20 and the flanges 22 serve another useful function in my lid besides shielding the aperture. This function is to induce drainage of such fluid grease particles as may accumulate on the bottom of the lid. It will be understood that in the absence of condensed moisture on the under side of the lid, due to the venting of the steam, these greases accumulate and are drained back upon the food and into the pan, thus basting the cooking meat or other food. This is a desirable result, as it is well known that basting adds to the flavor of the cooked food. This drainage backward is enhanced by the downward direction of the tongue 20 and flange 22. It is well known that a liquid will seek the lowest possible level, and these elements constituting downwardly directed members cause a movement of the droplets which finally accumulate and drip off the under side of the lid at the low points where their tension is broken.

It is also contemplated that lids according to my invention may be formed of "Pyrex" glass or other plastic materials without departing from the scope thereof.

I claim:

1. A utensil lid, comprising: a perforate plate adapted to rest upon the edge of a utensil to be closed, tongues on said plate each disposed slightly below a perforation and terminating in spaced relation with the perforation edge to define a venting slit, and depending means on said plate shielding said slits throughout the length of each.

2. A utensil lid, comprising: a perforate plate adapted to rest upon the edge of a utensil to be closed, a tongue on said plate disposed slightly below each perforation and terminating in spaced relation with the perforation edge to define a venting slit, and a flange along the under edge of said perforation and forming a shield for the venting slit.

3. A utensil lid, comprising: a perforate plate adapted to rest upon the edge of a utensil to be closed, a tongue on said plate angularly disposed slightly below each perforation and terminating in spaced relation with the perforation edge to define a venting slit, said tongues being directed outward from the axis of the plate, and a flange along the under edge of said perforation and forming a shield for the venting slit.

4. A utensil lid, comprising: a perforate plate adapted to rest upon the edge of a utensil to be closed, a tongue on said plate angularly disposed slightly below each perforation and terminating in spaced relation with the perforation edge to define a venting slit, said tongues being directed outward from the axis of the plate, and depending means on said plate shielding said slits.

5. A utensil lid, comprising: a plate adapted to rest upon the edge of a utensil to be closed, said plate having perforations therein, a tongue disposed under each perforation extending angularly downward from the flat side thereof and directed outward from the axis of the plate, and a flange along the under edge of said perforation and forming a shield for the venting slit.

GEO. P. CHRISTOPHER.